(12) United States Patent
Park

(10) Patent No.: US 12,532,873 B2
(45) Date of Patent: Jan. 27, 2026

(54) DEVICE FOR EXTRACTING FOREIGN MATTER IN FISH TANK

(71) Applicant: Jeong-Ryeol Park, Guri-si (KR)

(72) Inventor: Jeong-Ryeol Park, Guri-si (KR)

( * ) Notice: Subject to any disclaimer, the term of this patent is extended or adjusted under 35 U.S.C. 154(b) by 362 days.

(21) Appl. No.: 18/547,080

(22) PCT Filed: Jul. 12, 2022

(86) PCT No.: PCT/KR2022/010157
§ 371 (c)(1),
(2) Date: Aug. 18, 2023

(87) PCT Pub. No.: WO2023/038263
PCT Pub. Date: Mar. 16, 2023

(65) Prior Publication Data
US 2024/0138382 A1     May 2, 2024

(30) Foreign Application Priority Data
Sep. 10, 2021    (KR) .................. 10-2021-0121101

(51) Int. Cl.
*A01K 63/04*      (2006.01)
*B01D 29/11*      (2006.01)
*B01D 35/30*      (2006.01)

(52) U.S. Cl.
CPC .......... *A01K 63/045* (2013.01); *B01D 29/114* (2013.01); *B01D 35/30* (2013.01)

(58) Field of Classification Search
None
See application file for complete search history.

(56) References Cited

U.S. PATENT DOCUMENTS

| | | | | | |
|---|---|---|---|---|---|
| 1,582,399 | A | * | 4/1926 | Helander | F04B 43/08 137/143 |
| 2,218,941 | A | * | 10/1940 | Thompson | B01J 4/00 137/143 |

(Continued)

FOREIGN PATENT DOCUMENTS

| KR | 100808668 B1 * | 2/2008 | ............. A01K 63/10 |
|---|---|---|---|
| KR | 10-1271141 B1 | 6/2013 | |

(Continued)

OTHER PUBLICATIONS

International Search Report dated Sep. 19, 2022 in International Application No. PCT/KR2022/010157.

*Primary Examiner* — Robert J Popovics
(74) *Attorney, Agent, or Firm* — Saliwanchik, Lloyd & Eisenschenk

(57) ABSTRACT

The present invention relates to a device for extracting foreign matter in a fish tank and, more particularly, to a device for extracting foreign matter in a fish tank, wherein excrement of and food for fish, remaining in the fish tank, may be removed without a water exchange process, a filter is inhibited from being clogged, and foreign matter filtered by the filter is inhibited from entering the fish tank again. To this end, the device comprises a body into which water is introduced through an inlet pipe provided downward from the inside of the body and from which the introduced water is discharged through an outlet via a filter provided in the body, wherein the filter is spaced apart from the side of the body while surrounding the inlet pipe, and the outlet is formed beneath the filter, whereby foreign matter filtered by the filter is accumulated in the body through the space between the filter and the side of the body, and the water passing through the filter is discharged into the fish tank through the outlet.

3 Claims, 12 Drawing Sheets

(56) References Cited

U.S. PATENT DOCUMENTS

| | | | | |
|---|---|---|---|---|
| D166,284 S * | 3/1952 | Weilburg | | D30/106 |
| 2,614,529 A * | 10/1952 | Hansen | | A01K 63/045 |
| | | | | 210/220 |
| 2,672,987 A * | 3/1954 | Hutchinson | | A01K 63/04 |
| | | | | 210/136 |
| 2,725,356 A * | 11/1955 | Lombardi | | E04H 4/1618 |
| | | | | 210/167.16 |
| 2,744,065 A * | 5/1956 | Lacey | | A01K 63/042 |
| | | | | 261/36.1 |
| 2,765,275 A * | 10/1956 | Aaron | | A01K 63/045 |
| | | | | 210/167.25 |
| 2,786,026 A * | 3/1957 | Stark | | A01K 63/045 |
| | | | | 210/220 |
| 2,820,548 A * | 1/1958 | Marcus | | A01K 63/045 |
| | | | | 210/474 |
| 2,828,019 A * | 3/1958 | Lambertson | | A01K 63/10 |
| | | | | 210/416.2 |
| 2,899,063 A * | 8/1959 | Ellis, Jr. | | A01K 63/04 |
| | | | | 15/1.7 |
| 2,956,507 A * | 10/1960 | Hutchinson | | A01K 63/10 |
| | | | | 210/207 |
| D198,200 S * | 5/1964 | Willinger | | D30/106 |
| 3,132,364 A * | 5/1964 | Oxley | | E04H 4/1609 |
| | | | | 210/167.16 |
| 3,151,069 A * | 9/1964 | Halpert | | A01K 63/045 |
| | | | | 210/232 |
| 3,158,104 A * | 11/1964 | Hutchinson | | A01K 63/04 |
| | | | | 417/478 |
| 3,225,930 A * | 12/1965 | Willinger | | A01K 63/047 |
| | | | | 210/241 |
| 3,301,402 A * | 1/1967 | Falkenberg | | B01D 29/333 |
| | | | | 210/482 |
| 3,302,789 A * | 2/1967 | Holt | | A01K 63/045 |
| | | | | 210/167.25 |
| 3,360,129 A * | 12/1967 | Powers | | A01K 63/04 |
| | | | | 210/167.23 |
| D214,918 S * | 8/1969 | Willinger | | D30/106 |
| 3,549,015 A * | 12/1970 | Willinger | | A01K 63/10 |
| | | | | 92/58.1 |
| 3,630,364 A * | 12/1971 | Johnston | | E04H 4/1636 |
| | | | | 15/117 |
| 3,734,853 A * | 5/1973 | Horvath | | A01K 63/04 |
| | | | | 210/167.25 |
| 3,820,182 A * | 6/1974 | Vockroth | | A47L 13/00 |
| | | | | 210/167.16 |
| 3,826,371 A * | 7/1974 | Adamson | | A01K 63/045 |
| | | | | 210/167.26 |
| 3,994,811 A * | 11/1976 | Cohen | | A01K 63/04 |
| | | | | 210/240 |
| 4,033,719 A * | 7/1977 | Conn | | C02F 1/325 |
| | | | | 250/435 |
| 4,094,031 A * | 6/1978 | Cellini | | E04H 4/1609 |
| | | | | 15/341 |
| 4,094,788 A * | 6/1978 | Dockery | | A01K 63/04 |
| | | | | 210/167.21 |
| 4,137,772 A * | 2/1979 | Hitch | | G01N 1/12 |
| | | | | 73/863.23 |
| 4,233,702 A * | 11/1980 | Zweifel | | A01K 63/10 |
| | | | | 210/167.23 |
| 4,257,893 A * | 3/1981 | Burton | | A01K 63/10 |
| | | | | 210/167.21 |
| 4,290,883 A * | 9/1981 | Sama | | A01K 63/10 |
| | | | | 210/416.2 |
| D282,016 S * | 12/1985 | Chestnut | | D30/106 |
| 4,584,733 A * | 4/1986 | Tietge | | E04H 4/16 |
| | | | | 15/341 |
| 4,610,784 A * | 9/1986 | Reyniers | | A01K 63/04 |
| | | | | 137/562 |
| 4,722,670 A * | 2/1988 | Zweifel | | F04F 5/46 |
| | | | | 417/198 |
| 4,725,353 A * | 2/1988 | Whitman | | A01K 63/045 |
| | | | | 119/226 |
| 4,797,206 A * | 1/1989 | Lynch | | E04H 4/1636 |
| | | | | 210/167.16 |
| D304,506 S * | 11/1989 | Tominaga | | D30/106 |
| 4,894,942 A * | 1/1990 | Winkler | | A01K 79/00 |
| | | | | 43/4 |
| 4,896,392 A * | 1/1990 | Hull | | E04H 4/1609 |
| | | | | 15/1.7 |
| 4,935,980 A * | 6/1990 | Leginus | | E04H 4/16 |
| | | | | 210/167.16 |
| 4,944,101 A * | 7/1990 | Goble | | E04H 4/1609 |
| | | | | 210/136 |
| 5,048,140 A * | 9/1991 | Wu | | A01K 63/04 |
| | | | | 15/1.7 |
| 5,095,571 A * | 3/1992 | Sargent | | E04H 4/1609 |
| | | | | 210/167.16 |
| 5,122,285 A * | 6/1992 | Tartal | | E04H 4/16 |
| | | | | 210/801 |
| 5,135,647 A * | 8/1992 | Childers | | B01D 29/27 |
| | | | | 210/136 |
| 5,139,659 A * | 8/1992 | Scott | | A01K 63/047 |
| | | | | 119/261 |
| 5,203,990 A * | 4/1993 | Gargiulo | | A01K 63/045 |
| | | | | 119/261 |
| 5,207,900 A * | 5/1993 | Findell | | A01K 63/045 |
| | | | | 119/261 |
| 5,238,585 A * | 8/1993 | Reed, Sr. | | E04H 4/1645 |
| | | | | 15/409 |
| 5,240,596 A * | 8/1993 | Chesnut | | A01K 63/04 |
| | | | | 210/136 |
| 5,269,338 A * | 12/1993 | Figas | | F04F 10/00 |
| | | | | 119/245 |
| 5,279,730 A * | 1/1994 | Chen | | A01K 63/006 |
| | | | | 119/264 |
| 5,542,142 A * | 8/1996 | Young | | E04H 4/1609 |
| | | | | 210/776 |
| 5,582,719 A | 12/1996 | Nagano | | |
| 5,655,245 A * | 8/1997 | Bunch | | A01K 63/006 |
| | | | | 119/264 |
| 5,695,654 A * | 12/1997 | Schultz | | A01K 63/006 |
| | | | | 210/780 |
| 5,975,022 A * | 11/1999 | Miller | | A01K 63/10 |
| | | | | 119/264 |
| 6,019,891 A * | 2/2000 | Stoner | | E04H 4/1609 |
| | | | | 210/489 |
| 6,058,884 A * | 5/2000 | Rawls | | A01K 63/006 |
| | | | | 119/232 |
| 6,202,677 B1 * | 3/2001 | Chen | | A01K 63/045 |
| | | | | 137/391 |
| 6,248,232 B1 * | 6/2001 | Stoner | | E04H 4/1609 |
| | | | | 210/167.16 |
| 6,269,773 B1 * | 8/2001 | Rawls | | A01K 63/006 |
| | | | | 119/232 |
| 6,444,120 B1 * | 9/2002 | Morgan | | A01K 63/04 |
| | | | | 210/416.2 |
| 6,499,432 B2 * | 12/2002 | Ogawa | | A01K 63/04 |
| | | | | 119/264 |
| 6,878,267 B1 * | 4/2005 | Mandia | | A01K 63/10 |
| | | | | 210/232 |
| 7,001,510 B1 * | 2/2006 | Adame | | F04F 10/00 |
| | | | | 210/232 |
| 7,060,182 B2 * | 6/2006 | Erlich | | E04H 4/1636 |
| | | | | 210/167.16 |
| 7,090,769 B1 * | 8/2006 | Peterson | | E04H 4/1636 |
| | | | | 210/167.16 |
| 7,178,188 B1 * | 2/2007 | Jaakola | | E04H 4/1636 |
| | | | | 15/1.7 |
| 7,179,373 B1 * | 2/2007 | Wehmeyer | | A01K 63/045 |
| | | | | 210/776 |
| 7,214,314 B2 * | 5/2007 | Reyniers | | A01K 63/04 |
| | | | | 210/406 |
| 7,335,297 B2 * | 2/2008 | Getsinger | | A01K 63/045 |
| | | | | 210/416.2 |
| 7,360,502 B2 * | 4/2008 | Flasch | | A01K 63/10 |
| | | | | 119/259 |
| 7,363,878 B2 * | 4/2008 | McRobert | | A01K 63/04 |
| | | | | 119/245 |

(56) References Cited

U.S. PATENT DOCUMENTS

| | | | | |
|---|---|---|---|---|
| 7,378,026 B1 * | 5/2008 | Thompson | | E04H 4/1636 |
| | | | | 210/167.16 |
| 7,465,392 B1 * | 12/2008 | Wang | | A01D 44/00 |
| | | | | 241/46.11 |
| D640,424 S * | 6/2011 | Yen | | D30/106 |
| 8,246,831 B2 * | 8/2012 | McFarland | | C02F 3/104 |
| | | | | 210/167.26 |
| 8,534,229 B2 * | 9/2013 | Hudson | | A01K 63/10 |
| | | | | 119/264 |
| 8,632,677 B2 * | 1/2014 | Sherman | | A01K 63/10 |
| | | | | 210/242.1 |
| 8,733,385 B2 * | 5/2014 | Ogawa | | A01K 63/10 |
| | | | | 119/264 |
| 9,326,492 B2 * | 5/2016 | Rantala | | A01K 63/10 |
| 9,435,132 B1 * | 9/2016 | Wagner | | E04H 4/1618 |
| D785,260 S * | 4/2017 | Lin | | D32/18 |
| 10,349,637 B2 * | 7/2019 | Erlich | | A01K 63/10 |
| 10,392,775 B2 * | 8/2019 | Smith | | F04F 5/24 |
| D973,284 S * | 12/2022 | Cao | | D30/106 |
| D1,044,188 S * | 9/2024 | Ye | | D30/106 |
| 12,213,463 B2 * | 2/2025 | Ogawa | | B08B 9/087 |
| 12,246,971 B2 * | 3/2025 | Wennerström | | C02F 1/003 |
| 2003/0101523 A1 * | 6/2003 | Lepley, Jr. | | E04H 4/1636 |
| | | | | 15/1.7 |
| 2004/0164033 A1 * | 8/2004 | Reyniers | | B01D 21/0006 |
| | | | | 210/800 |
| 2007/0051320 A1 * | 3/2007 | Yen | | A01K 63/045 |
| | | | | 119/264 |
| 2007/0068858 A1 * | 3/2007 | Davison | | A01K 63/10 |
| | | | | 119/264 |
| 2012/0181222 A1 * | 7/2012 | Sherman | | A01K 63/006 |
| | | | | 210/138 |
| 2023/0012214 A1 * | 1/2023 | Wennerström | | C02F 1/003 |
| 2024/0138382 A1 * | 5/2024 | Park | | B01D 29/114 |
| 2024/0180129 A1 * | 6/2024 | Kim | | A01K 63/04 |

FOREIGN PATENT DOCUMENTS

| | | | | |
|---|---|---|---|---|
| KR | 20-2020-0000051 U | | 1/2020 | |
| KR | 10-2348032 B1 | | 1/2022 | |
| WO | 2010/110547 A2 | | 9/2010 | |
| WO | WO-2011145821 A2 * | | 11/2011 | A01K 63/006 |

\* cited by examiner

DEVICE FOR EXTRACTING FOREIGN MATTER IN FISH TANK

CROSS-REFERENCE TO RELATED APPLICATIONS

This application is the U.S. national stage application of International Patent Application No. PCT/KR2022/010157, filed Jul. 12, 2022, which claims the benefit under 35 U.S.C. § 119 of Korean Application No. 10-2021-0121101, filed Sep. 10, 2021, the disclosures of each of which are incorporated herein by reference in their entirety.

TECHNICAL FIELD

The present disclosure relates to a device for extracting foreign matter in a fish tank and, more particularly, to a device for extracting foreign matter in a fish tank, wherein excrement of and food for fish, remaining in the fish tank, may be removed effectively without a water exchange process.

BACKGROUND ART

In general, a fish tank or an aquarium is made of transparent glass or acrylic so that the inside can be seen, and is used to keep fish in by putting aquarium sand or/and ornaments at the bottom of the tank and filling the tank with water.

In the process of feeding and keeping fish in a fish tank, after a certain period of time, leftover uneaten fish food or fish excrement accumulates at the bottom of the tank, and when these wasteful products decompose by bacteria, toxic substances such as ammonia, nitrous acid, and nitrate are released and dissolved in the water, which causes the fish to be stressed or killed by poisoning.

In order to prevent this, the inside of a fish tank must be cleaned periodically, and a pipette dropper or siphon is mainly used for cleaning. Yet, the pipette dropper or manual siphon is cumbersome because a user has to continuously press a pump, and a drip tray is required for waste discharge, and since a small or large amount of water is discharged, replenishment water is needed after cleaning work. In the case of an electric siphon, fine foreign matter may not be filtered out since the electric siphon uses a filter made in the form of a mesh, and the filter is quickly clogged due to its small surface area.

Korean Patent No. 10-1271141 (hereinafter referred to as "cited invention") discloses an aquarium cleaner involving a technique that fills a body of the cleaner with air and opens a check valve to allow air to be discharged and at the same time to allow water and foreign matter to flow into the body, and then only filtered water is discharged out of the body through an outlet.

According to the cited invention, foreign matter remaining at the bottom of the aquarium may be filtered to some extent, and water is not discharged to the outside of the aquarium during cleaning work, so there is no need to additionally supplement water. The problem, however, is that since a filter that filters foreign matter is made of cotton, the filter does not play its role quickly, especially as the water introduced into the body escapes from the upper side of the filter, the foreign matter filtered through the filter floats, and during the process of cleaning using the cited invention or/and taking the cited invention out of the aquarium after cleaning, the floating foreign matter are returned to the aquarium.

DISCLOSURE

Technical Problem

Accordingly, the present disclosure has been made keeping in mind the above problems occurring in the related art, and the present disclosure is intended to propose a device for extracting foreign matter in a fish tank, wherein excrement of and food for fish, remaining in the fish tank, may be removed without a water exchange process, a filter is inhibited from being clogged, and foreign matter filtered by the filter is inhibited from entering the fish tank again.

Technical Solution

In order to achieve the above objectives, according to an embodiment of the present disclosure, there is provided a device for extracting foreign matter in a fish tank, the device including: a body in which water is introduced through an inlet pipe provided downward from inside the body, and the introduced water passes through a filter provided inside the body and is discharged through an outlet, wherein the filter may be provided to surround the inlet pipe and to be spaced apart from sides of the body, and the outlet may be provided below the filter;

In addition, a lower part of the body may be composed of a lower body forming a convex hemisphere downward, through which the inlet pipe passes, and through which the outlet is formed outside the inlet pipe passing through the lower body, and the filter may be provided to have a lower outer edge thereof come into contact with a curved surface of the lower body.

In addition, the outlet may be formed by penetrating a point adjacent to an inner circumferential surface of the filter in the lower body, and the lower body may be provided with a seating protrusion protruding upward along an outer edge of the outlet so as to come into contact with a lower end of the filter while forming a ring shape.

In addition, the lower body may be provided with a guide pipe whose lower end may be located inside the outlet while forming a tube shape, whose upper end may be located near an upper end of the inlet pipe provided inside the guide pipe, with the filter being fitted over the guide pipe, the filter may be made of a sponge material and may be formed to a length such that an upper end thereof is positioned above the guide pipe in a state where the lower end thereof is supported by the seating protrusion, and the body may be provided with a filter fixture coupled to an upper end of the guide pipe while pressing the filter protruding upward from the guide pipe downward.

In addition, the filter may be provided in the form of a cylinder having a predetermined thickness and having a hollow formed therethrough along a longitudinal direction, and may be provided with a discharge passage recessed along the longitudinal direction of an inner circumferential surface thereof.

In addition, a holder provided with a fixing pipe upward from a point spaced apart from a bottom of the fish tank, and placed on the bottom of the fish tank may be further included, and wherein the body may be arranged such that the inlet pipe may communicate with the fixing pipe, so that water may flow into the inlet pipe through the fixing pipe.

Advantageous Effects

According to the present disclosure, in the process of water in a fish tank flowing into a body of a device for extracting foreign matter in a fish tank and being discharged, foreign matter filtered by a filter is accumulated in the body, and the water that has passed through the filter is discharged into the fish tank through an outlet. That is, since the supply of supplementary water is not required in removing excrement of and food for fish, remaining in the fish tank, there is no need for performing water changes, which can increase user convenience.

Furthermore, water passes through the filter having a predetermined thickness and a large surface area, and in this process, since foreign matter filtered by the filter is accumulated in the body through the space between the filter and the sides of the body, the filter is not clogged. In addition, since discharged water is discharged through the outlet provided below the filter, foreign matter accumulated in the body does not float while the water is discharged, inhibiting the filtered foreign matter from reentering the fish tank.

The present disclosure can not only be used when cleaning the fish tank, but also can be mounted in the tank using a holder to continuously filter out foreign matter so that the fish tank can be kept clean at all times.

BEST MODE

In the present disclosure, a device for extracting foreign matter in a fish tank is proposed, wherein excrement of and food for fish, remaining in the fish tank, may be removed without a water exchange process, a filter is inhibited from being clogged, and foreign matter filtered by the filter is inhibited from entering the fish tank again. To this end, the device includes a body into which water is introduced through an inlet pipe provided downward from the inside of the body and from which the introduced water is discharged through an outlet via a filter provided in the body, wherein the filter is spaced apart from the side of the body while surrounding the inlet pipe, and the outlet is formed beneath the filter, whereby foreign matter filtered by the filter is accumulated in the body through the space between the filter and the side of the body, and the water passing through the filter is discharged into the fish tank through the outlet.

The scope of the present disclosure is not limited to the embodiments described below, and the present disclosure may be variously modified and implemented by those skilled in the art without departing from the technical gist of the present disclosure.

Hereinafter, a device for extracting foreign matter in a fish tank according to the present disclosure will be described in detail with reference to the attached FIGS. 1 to 12.

Figure 1:
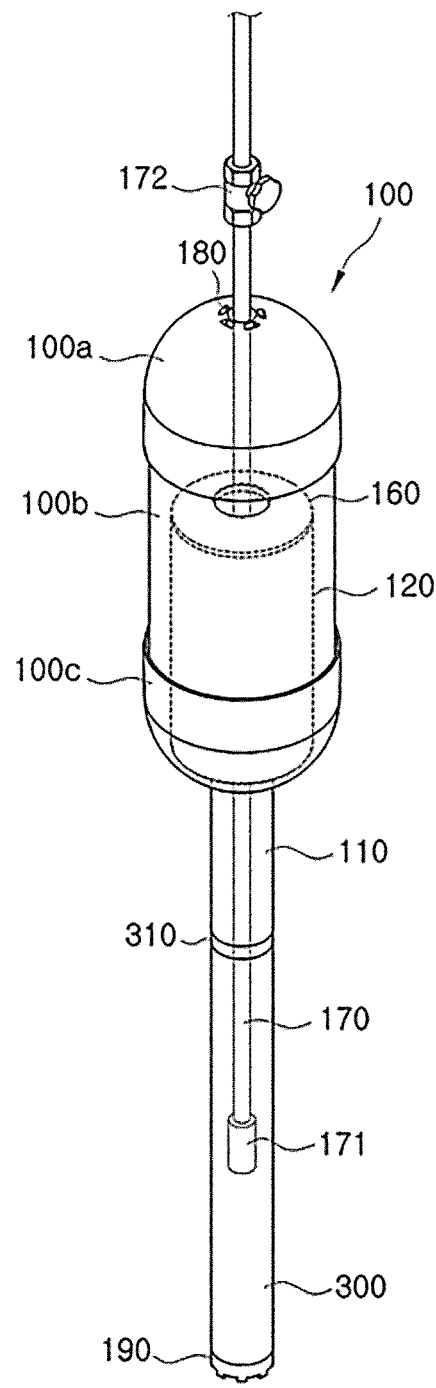
FIG. 1 is a perspective view showing a device for extracting foreign matter in a fish tank according to an embodiment of the present disclosure.
Figure 2:
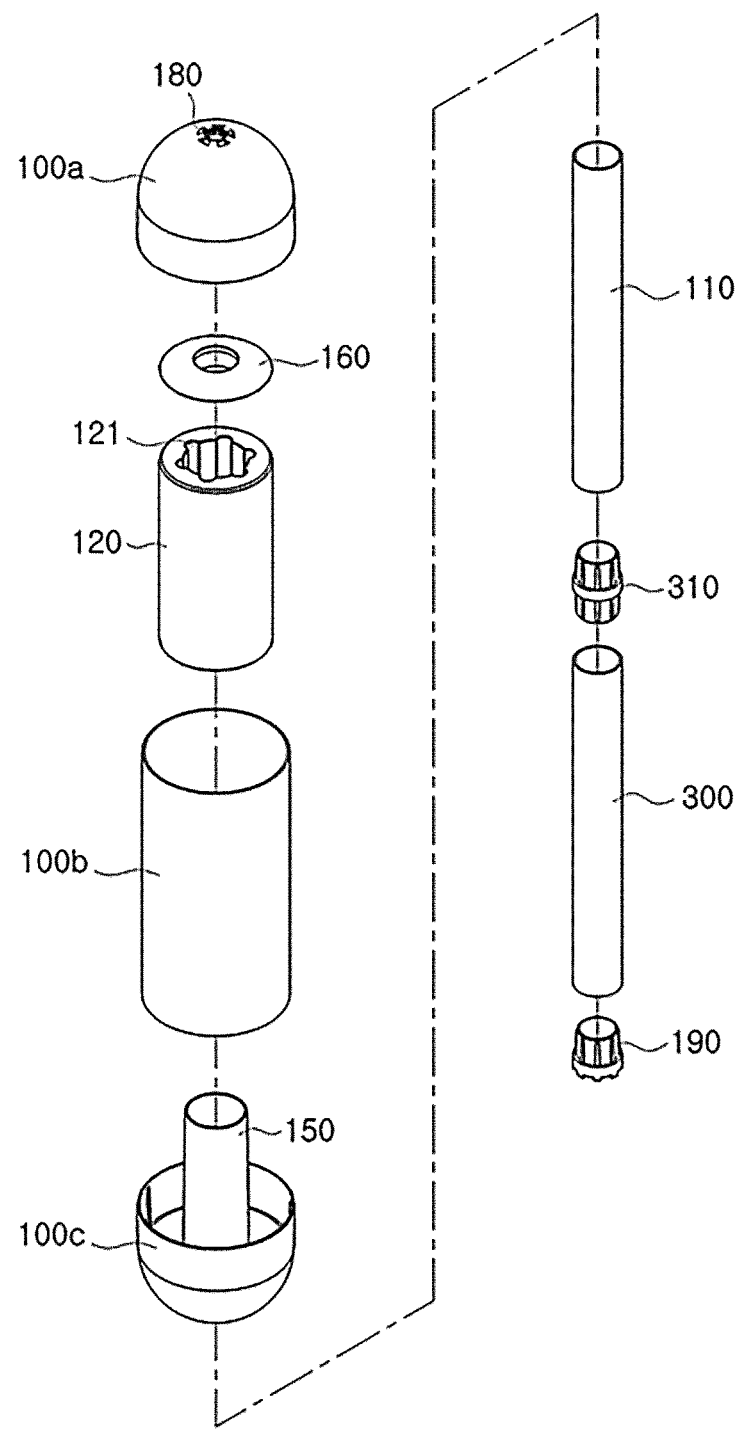
FIG. 2 is an exploded perspective view showing the device for extracting foreign matter in a fish tank according to the embodiment of the present disclosure.
Figure 3:
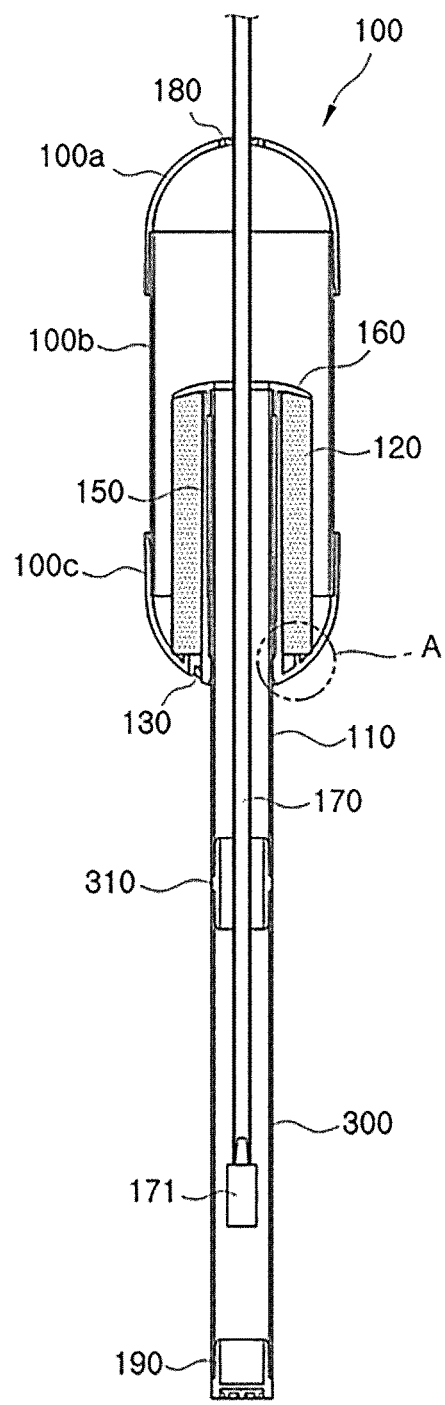
FIG. 3 is a longitudinal cross-sectional view showing the device for extracting foreign matter in a fish tank according to the embodiment of the present disclosure.

As shown in FIGS. 1 to 3, a device for extracting foreign matter in a fish tank according to the present disclosure includes a body 100 having a predetermined length and forming a tubular shape, and it is preferable that at least a part of the side of the body 100 is made transparent or translucent so that a user can check the inside. The body 100 may include, for example, an intermediate body 100b having a cylindrical shape with an empty interior and open ends, an upper body 100a coupled to the upper end of the intermediate body 100b and forms a convex hemisphere upward, and a lower body 100c coupled to the lower end of the intermediate body 100b and forms a convex hemisphere downward.

As shown in FIGS. 1 to 3, the body 100 is provided with an inlet pipe 110 forming a tubular shape downward from the inside of the body, a filter 120 therein, and an outlet, so that water received in a fish tank is introduced into the body 100 through the inlet pipe 110 and then passed through the filter 120 and discharged through the outlet 130.

To be specific, the inlet pipe 110 is provided in a rigid pipe shape, a part of which is located inside the body 100 and the other part of which penetrates the bottom surface of the body 100 so that a part thereof protrudes downward from the body 100. The inlet pipe 110 is provided, for example, to pass through the center of the lower body 100c in the vertical direction. At this time, the upper end of the inlet pipe 110 is preferably located at a point corresponding to half the length of the body 100 or slightly lower than that, so that only a part of the inside of the body 100 is filled with water.

The filter 120 has a cylindrical shape having a predetermined thickness and having a hollow through which the inlet pipe 110 passes along the longitudinal direction to make the surface thereof in contact with water large. Accordingly, foreign matter such as fish excrement and fish food contained in the water introduced from the fish tank may be effectively filtered by the filter 120. In addition, the filter 120 may be made of various materials, but is preferably made of a sponge material that is porous and deformable when force is applied.

Figure 4:
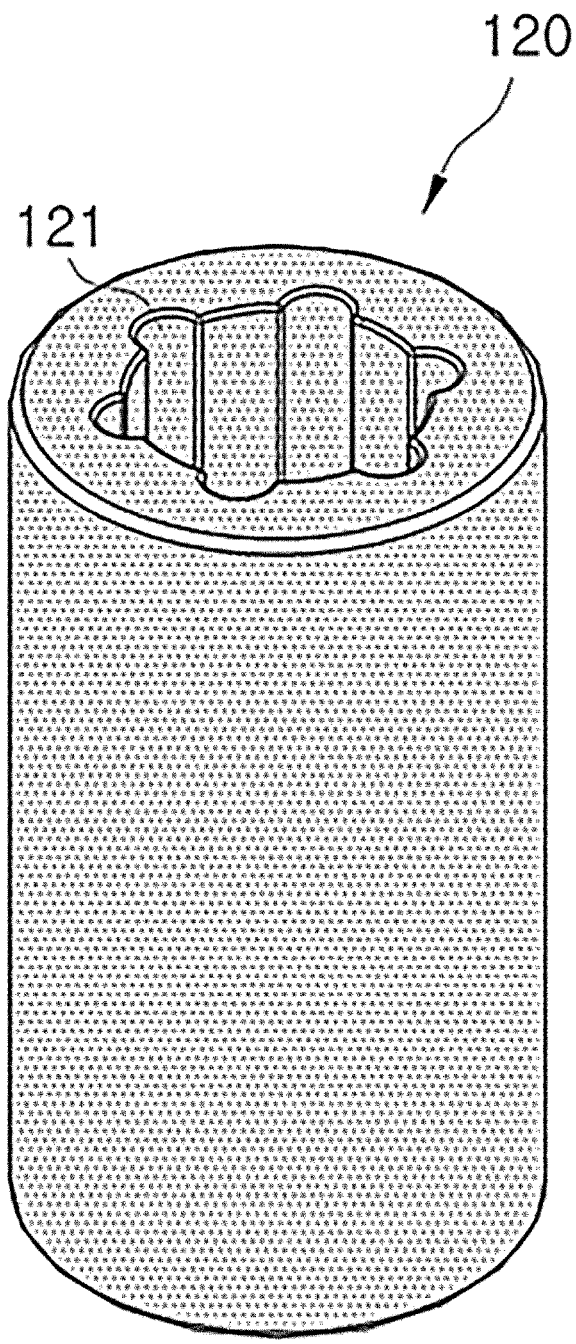
FIG. 4 is a perspective view showing a filter applied to the device for extracting foreign matter in a fish tank according to the present disclosure.

As shown in FIGS. 2 and 4, the filter 120 may have a discharge passage 121 recessed along the longitudinal direction of the inner circumferential surface thereof, and a plurality of discharge passages 121 may be formed spaced apart at predetermined intervals. As a smooth flow of water from which foreign matter are filtered out by the filter 120 is achieved through the discharge passages 121, the performance of the filter concentrated in the lower part of the filter 120 may be dispersed throughout the filter 120.

Figure 5:
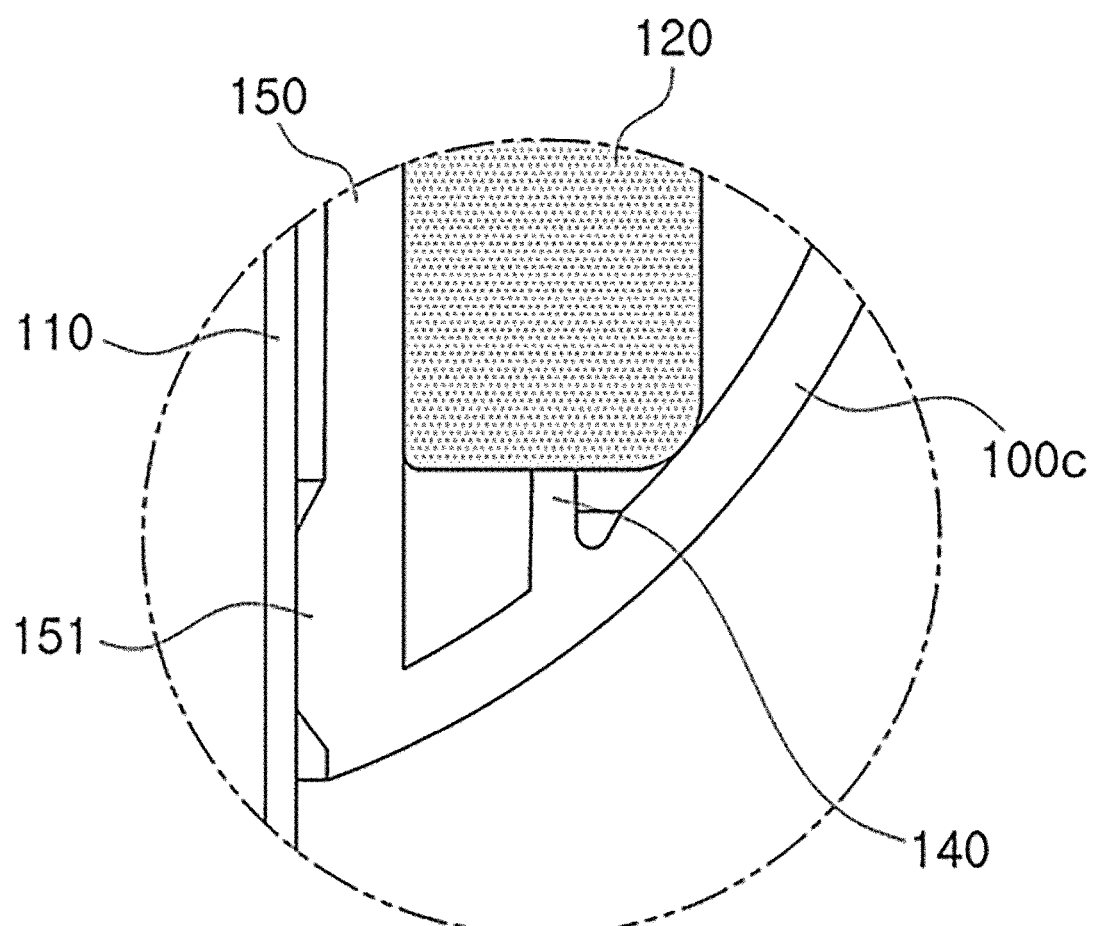
FIG. 5 is an enlarged view showing part A of FIG. 3.
Figure 7:
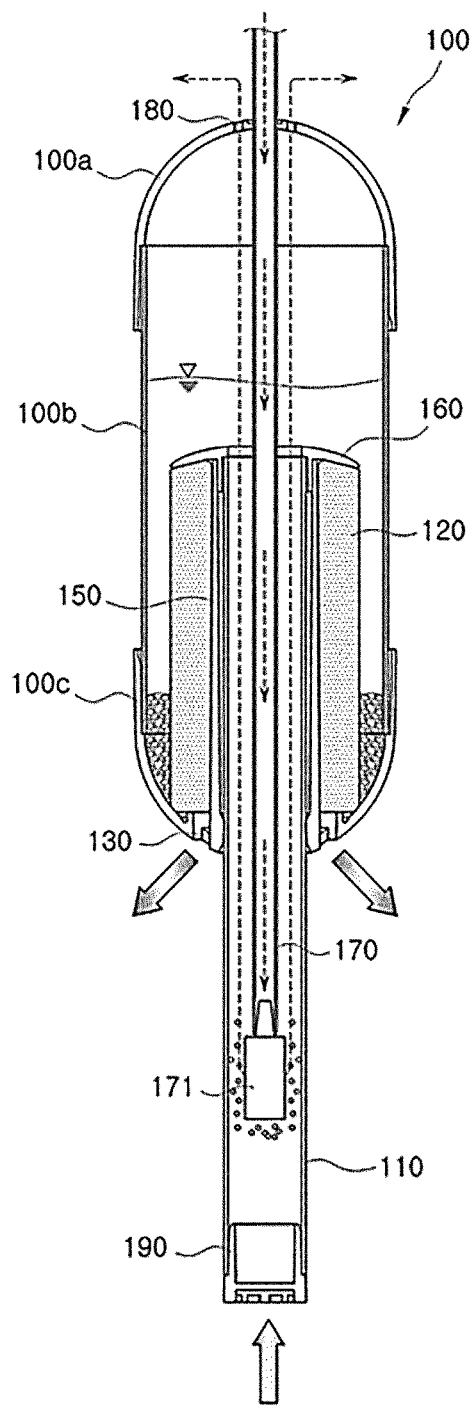
FIG. 7 is an exemplary view showing that water and air flow in and out through the device for extracting foreign matter in a fish tank according to the present disclosure.

As shown in FIGS. 3 and 7, the sides of the filter 120 is provided to be spaced apart from the sides of the body 100 while surrounding the inlet pipe 110, so that a spaces are created between the filter 120 and the sides of the body 100. Thus, filtered foreign matter that do not pass through the filter 120 move downward through the spaces between the filter 120 and the sides of the body 100 and are accumulated in the body 100. In addition, as shown in FIG. 5, the filter 120 may be provided so that the lower outer edge thereof comes into contact with the curved surface of the lower body 100c. Due to this, the spaces between the sides of the filter 120 and the sides of the body 100 in which foreign matter are accumulated and a space between the bottom surface of the filter 120 and the lower end of the lower body 100c may be separated.

As shown in FIGS. 3 and 7, the outlet 130 is provided in the body 100 below the filter 100. As an example, the outlet 130 is formed by penetrating the bottom of the body 100, that is, the lower side of the filter 120 seated in the lower body 100c, and may be formed along an adjacent outer side of the inlet pipe 110 passing through the center of the lower body 100c. To be specific, the outlet 130 may be formed through a point adjacent to the inner circumferential surface of the filter 120 in the lower body 100c.

Figure 6:
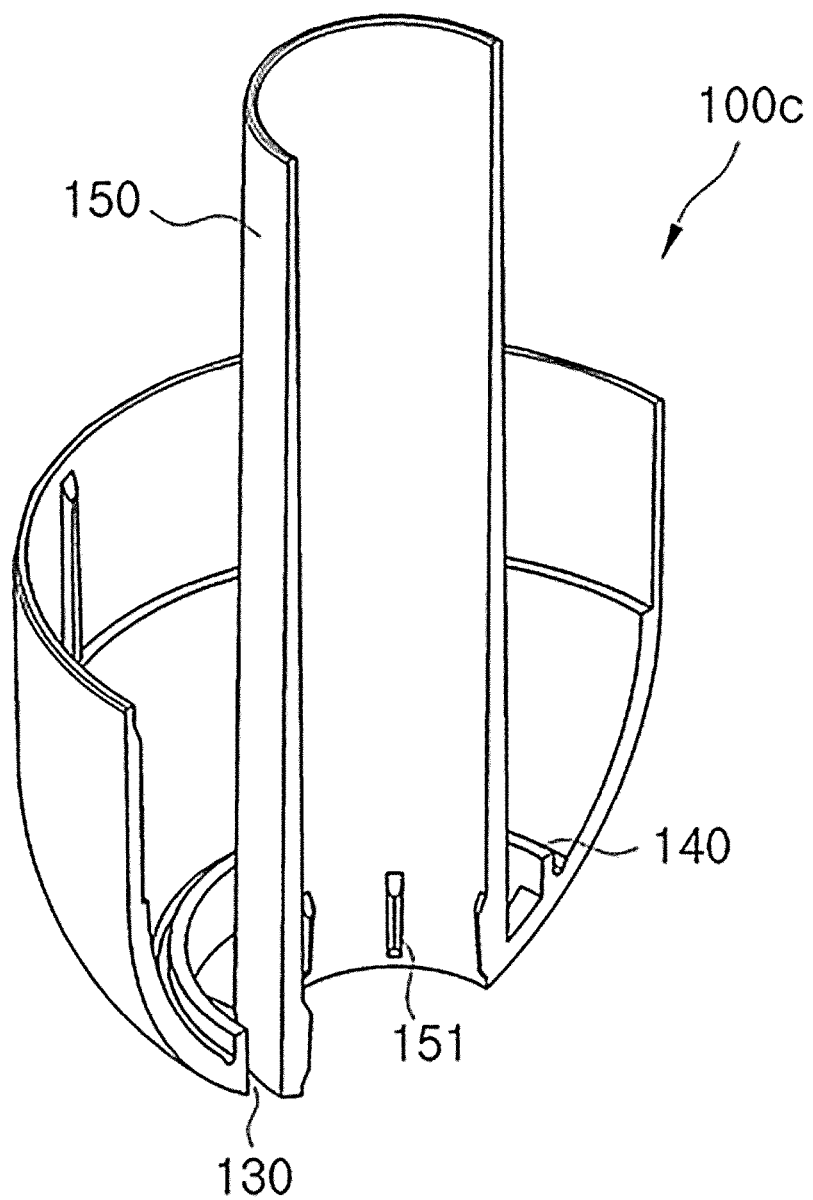
FIG. 6 is a cutaway perspective view showing a lower body applied to the device for extracting foreign matter in a fish tank according to the present disclosure.

In addition, a configuration that secondarily blocks the discharge of foreign matter while allowing the filter 120 to be more stably seated on the lower body 100c around the outlet 130 may be provided in the body 100. As an example, as shown in FIGS. 5 and 6, in the lower body 100c, a seating protrusion 140 protruding upward to form a ring shape along the outer edge of the outlet 130, and having an upper end in contact with the lower end of the filter 120 may be provided. Accordingly, the filter 120 may maintain a stable seated state as the lower outer edge of the filter 120 contacts the curved surface of the lower body 100c and at the same time, a part of the lower surface of the filter 120 comes into contact with the upper end of the seating protrusion 140. In addition, although the lower outer edge of the filter 120 is in contact with the curved surface of the lower body 100c, some of the foreign matter having fine particles may be moved toward the outlet 130 through the gap between the filter 120 and the lower body 100c, and the seating protrusion 140 may inhibit these fine foreign matter from escaping into the outlet 130.

Figure 8:
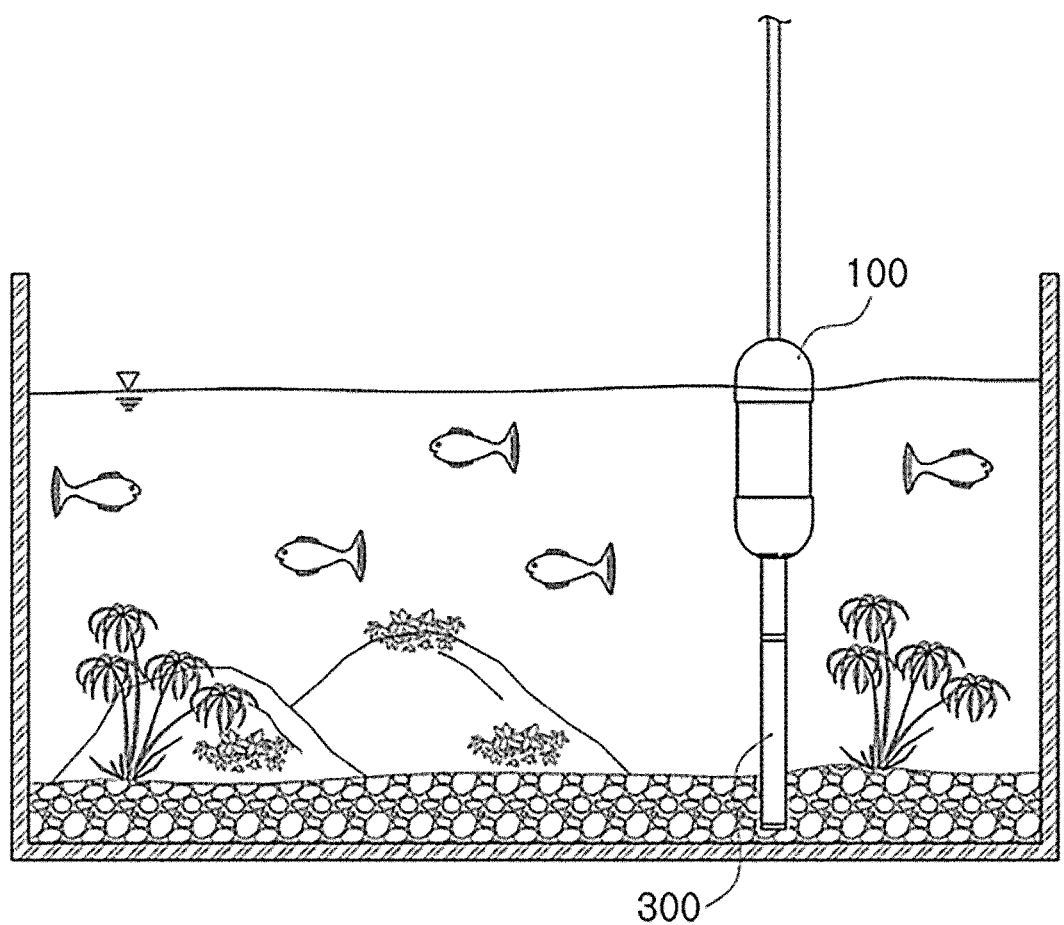
FIG. 8 is an exemplary view showing the use of the device for extracting foreign matter in a fish tank according to the present disclosure.

As previously mentioned, since the outlet 130 is located below the filter 120 in the body 100, water passing through the filter 120 is discharged to the lower side of the body 100 as shown in FIG. 7. Removal of foreign matter in a fish tank using the present disclosure is performed in a state in which a part of the body 100 is submerged in water, and the water discharged through the outlet 130 is discharged into the fish tank as shown in FIG. 8. That is, since the water of the fish tank introduced into the body 100 to filter the foreign matter is discharged back into the fish tank with only the foreign matter filtered out, there is no need to separately supply replenishment water and to perform water changes, thereby increasing user convenience.

Moreover, since the water is discharged to the lower side of the body 100 while being separated from the filtered foreign matter, the foreign matter accumulated in the body 100 does not float during the cleaning process of the fish tank, and the foreign matter does not float even during the process of removing the body 100 from the fish tank after cleaning the fish tank, thereby inhibiting the filtered foreign matter from reentering the fish tank. In addition, since the lower body 100c constituting the lower part of the body 100 on which foreign matter are accumulated may be configured to be detachable and may be separated and washed after cleaning, washing may be facilitated by separating the lower body 100c in a state where foreign matter are accumulated. Furthermore, since the filter 100 is provided to be spaced apart from the outlet 130, water is filled to the lower side of the filter 100 in the lower body 100c, so that water may be more easily discharged through the outlet 130.

Meanwhile, in the body 100 of the present disclosure, a guide pipe 150 may be provided to stably fix the filter 120 and to ensure a part of the inlet pipe 110 located in the body 100 is in place. The guide pipe 150 may be, for example, provided upward from the center of the lower body 100c, the lower end of which is inside the discharge port 130, while forming a tube shape with open ends and an empty inside as shown in FIGS. 2, 3 and 6. At this time, the guide pipe 150 is formed to have a larger diameter than the inlet pipe 110 so that the inlet pipe 110 is inserted into the guide pipe, and has an upper end positioned near the upper end of the inlet pipe 110 provided inside the guide pipe.

As shown in FIGS. 5 and 6, a fixing protrusion 151 for fixing the inlet pipe 110 inserted inside of the guide pipe 150 may be protruded from the inner circumferential surface of the lower end of the guide pipe 150. A plurality of fixing protrusions 151 are spaced apart at regular intervals and protrude from the inner circumferential surface of the lower end of the guide pipe 150 to come into contact with the side surfaces of the inlet pipe 110. That is, the inlet pipe 110 inserted into the guide pipe 150 may be clamped and fixed by the plurality of fixing protrusions 151, and if necessary, the upper end of the inlet pipe 110 may be aligned with the guide pipe 150, as well as lower than the guide pipe 150 or higher than the guide pipe 150.

The filter 120 is fitted over the guide pipe 150, and the filter 120 fitted over the guide pipe 150 may be formed to a length such that the upper end thereof may be located above the guide pipe 150 when seated on the lower body 100c (i.e., in a state where the lower end of the guide pipe 150 is supported by the seating protrusion 140). As such, the filter 120 formed to have a longer length than the guide pipe 150 is compressed and provided in the body 100. To this end, in the body 100, a filter fixture 160 coupled to an upper end of the guide pipe 150 while pressing the filter 120 protruding upward from the guide pipe 150 downward may be provided as shown in FIGS. 1 to 3.

The filter fixture 160 may be, for example, formed in a plate shape covering the upper surface of the filter 120 while having a convex upper surface, and may have an inlet having a diameter corresponding to that of the inlet pipe 110 may be formed in the center. In addition, the filter fixture 160 may be provided with a coupling protrusion that protrudes downward from the bottom surface thereof and is inserted between the guide pipe 150 and the inlet pipe 110 and coupled with the guide pipe 150. Accordingly, a user may ensure that the filter 120 is securely fixed within the body 100 by fitting the filter 120 to the guide pipe 150, placing the filter fixture 160 on top of the filter 120, and pressing the filter 120 until the filter 120 is combined with the guide pipe 150. In addition, since the compressed filter 120 may filter foreign matter of smaller particles, the performance of the filter may be improved.

Meanwhile, various methods may be adopted to form a flow of water for introducing and discharging water into/from the body 100. For example, a method using air may be adopted.

To be specific, as shown in FIGS. 1 and 3, in the body 100, an air supply pipe 170 supplying air into the inlet pipe 110 may be provided. The air supply pipe 170 may be made of a rigid material, but is preferably made of a flexible material and formed transparently. In addition, an air stone 171 forming many air bubbles may be provided at an end of the air supply pipe 170 located in the inlet pipe 110 so that the air flows smoothly. The air supply pipe 170 is inserted into the body 100 through an installation hole formed through the center of the upper body 100a so that the air stone 171 is positioned in the inlet pipe 110. Due to the buoyancy of the air supplied through the air supply pipe 170, an updraft is formed in the inlet pipe 110, and thus water in the fish tank is introduced through the inlet pipe 110.

In addition, as shown in FIG. 1, an air control member 172 for adjusting the amount of air supplied through the air supply pipe 170 may be provided at a portion of the air supply pipe 170 located outside the body 100. As an example, the air control member 172 may be configured to open/close the entire air supply pipe 170 or only partially open the air supply pipe 170 by turning a screw-coupled adjuster.

As shown in FIGS. 1 to 3, an air outlet 180 through which air is discharged to the outside around the installation hole may be formed through the upper body 100a. The air moved upward together with the water along the inlet pipe 110 is separated from the water at the top of the body 100 and is discharged to the outside through the air outlet 180. In addition, the air supply pipe 170 passing through the installation hole may be forcedly fitted, and accordingly, the user may push or pull the air supply pipe 170 in consideration of the length of the passage through which air is introduced (inlet pipe 110, or the inlet pipe 110 and an extension inlet pipe 300 to be described later), the desired flow rate, and the like.

According to the present disclosure, when the length of only the inlet pipe 110 provided in the body 100 is sufficient, a through hole may be formed at the lower end of the inlet pipe 110 so that only water mixed with foreign matter may pass through without flooring materials at the bottom of the fish tank passing through, or an inlet cover 190 having the through hole may be detachably coupled to the lower end of the inlet pipe 110 as shown in FIG. 7. In this case, foreign matter in the fish tank may be removed using only the body 100.

When the inlet pipe 110 provided in the body 100 is not long enough to clean the fish tank, the present disclosure may further include the extension inlet pipe 300 coupled to the end of the inlet pipe 110 located outside the body 100 and forming a pipe shape having a predetermined length as shown in FIGS. 1 to 3. At this time, the extension inlet pipe 300 may be directly coupled to the end of the inlet pipe 110, as well as indirectly coupled to the end of the inlet pipe 110 through a separate extension joint 310. The end of the inlet pipe 110 to which the extension inlet pipe 300 is coupled is in an open state and communicates with one end of the extension inlet pipe 300, while at the other end of the inlet pipe 110, the through hole may be formed or the inlet cover 190 having the through hole may be detachably coupled.

According to the present disclosure as described above, after positioning the body 100 in the fish tank as shown in FIG. 8, fish excrement or fish food remaining on the entire bottom of the fish tank may be sucked into the body 100 while moving the body 100.

On the other hand, by allowing the body 100 to be placed in the fish tank, foreign matter in the fish tank may be continuously filtered out. To this end, the present disclosure may further include a holder 200 placed on the bottom of the fish tank as shown in FIGS. 9 to 12. At this time, the bottom of the fish tank may mean the bottom surface of the fish tank itself, as well as flooring materials spread on the bottom surface of the fish tank.

Figure 9:
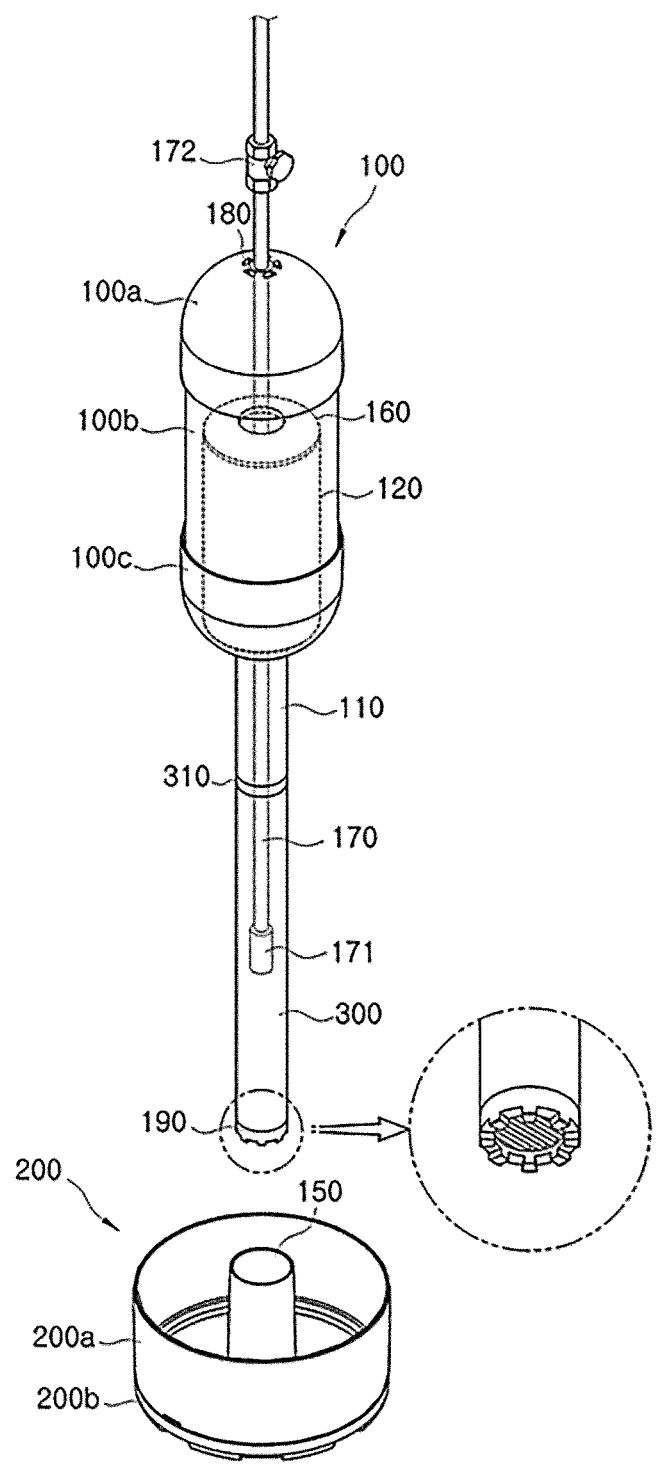
FIG. 9 is a perspective view showing a device for extracting foreign matter in a fish tank according to another embodiment of the present disclosure.
Figure 10:
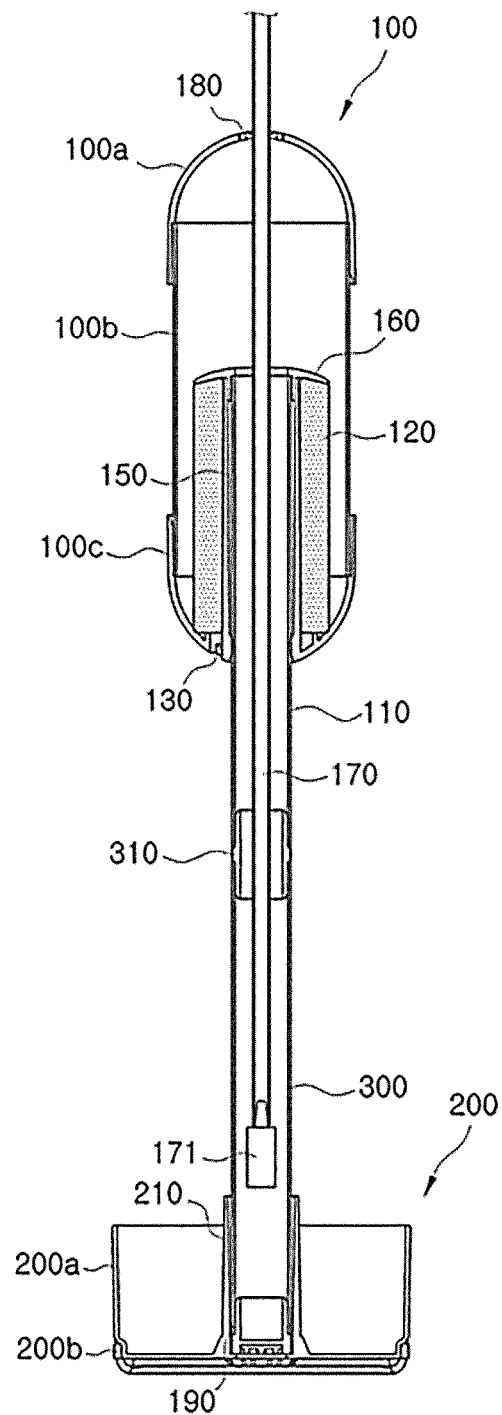
FIG. 10 is a longitudinal cross-sectional view showing the device for extracting foreign matter in a fish tank according to another embodiment of the present disclosure.
Figure 11:
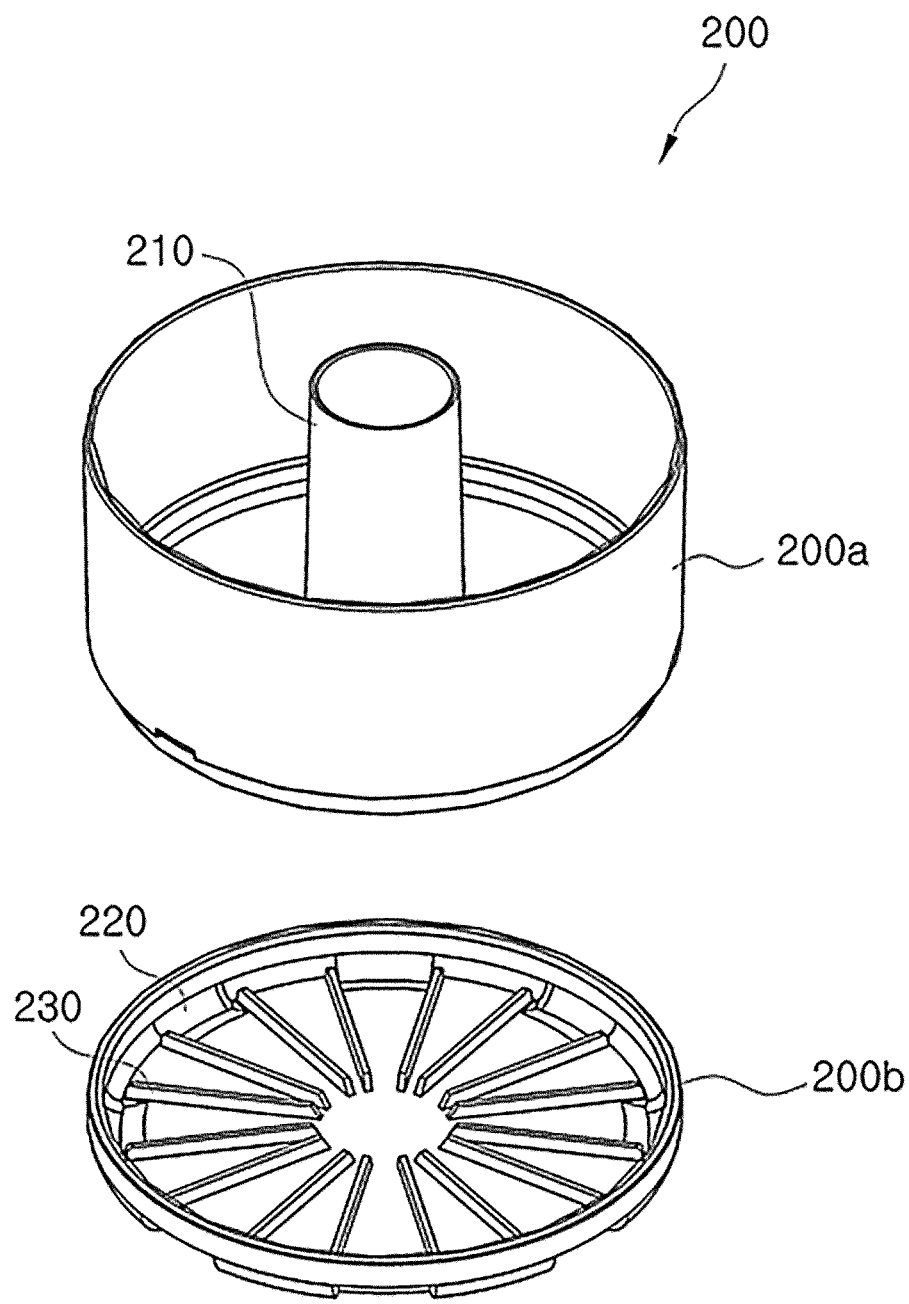
FIG. 11 is an exploded perspective view showing a holder applied to the device for extracting foreign matter in a fish tank according to another embodiment of the present disclosure.

As an example, as shown in FIGS. 9 to 11, the holder 200 may include: a holding body 200a with an open upper surface and a hollow tube shape; and a holding support 200b coupled to the lower end of the holding body 200a, placed on the bottom of the fish tank, and has an inlet hole 220 through which water may flow inside. That is, the bottom of the holding body 200a is spaced apart from the bottom of the fish tank due to the holding support 200b, and the holding body 200a spaced apart from the bottom of the fish tank is provided with a fixing pipe 210 upward from the bottom thereof. The fixing pipe 210 communicates with the inside of the holding support 200b, and thus water introduced through the inlet hole 220 of the holding support 200b may be moved to the fixing pipe 210.

The fixing pipe 210 is formed in a tube shape, and is preferably formed in the form of a pipe having a larger diameter than the inlet pipe 110 or the extension inlet pipe 300 so that the inlet pipe 110 or the extension inlet pipe 300 may be located inside the fixing pipe 210. Accordingly, as shown in FIG. 10, since the body 100 may be coupled to the holder 200 so that the inlet pipe 110 and the fixing pipe 210 communicate, water in the fish tank is introduced through the inlet hole 220, the fixing pipe 210, and the inlet pipe 120 sequentially by the updraft of air supplied through the air supply pipe 170.

Figure 12:
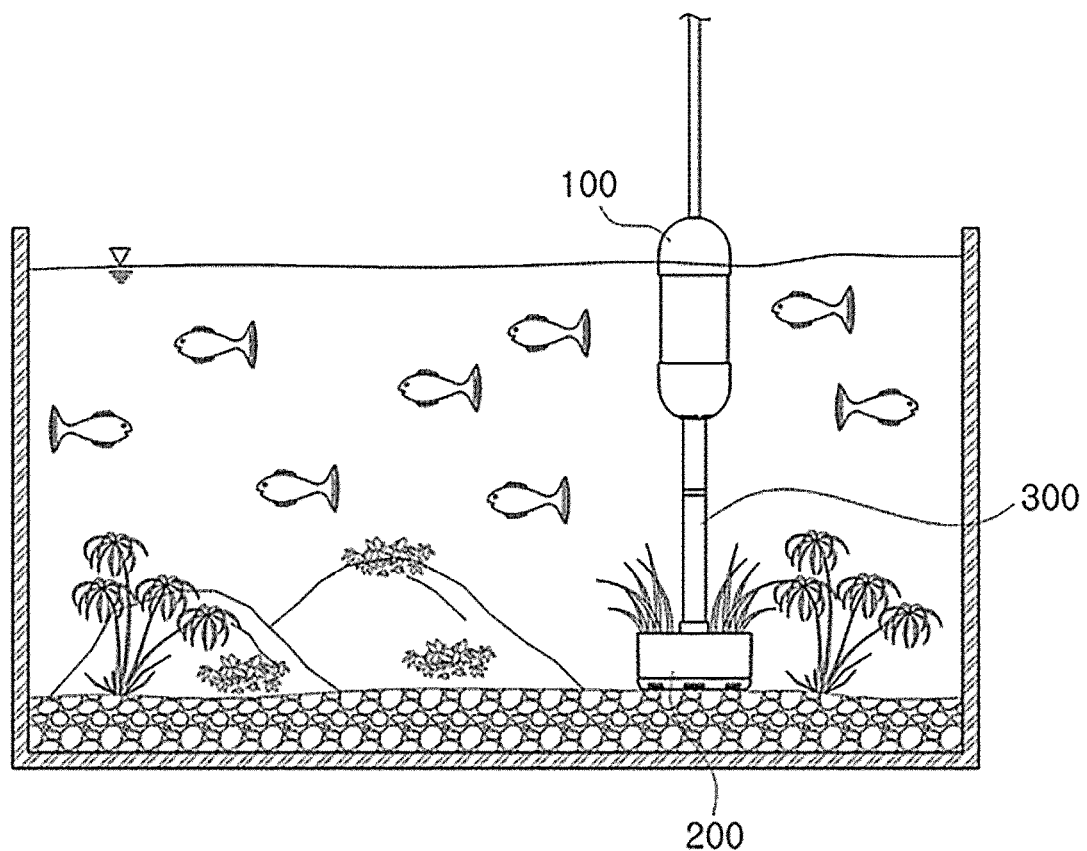
FIG. 12 is an exemplary view showing the use of the device for extracting foreign matter in a fish tank according to another embodiment of the present disclosure.

The fixing pipe 210 may protrude more from the center of the lower surface of the holder 200 than the upper end of the holding body 200a. In addition, as shown in FIG. 12, the space between the fixing pipe 210 and the sidewall of the holding body 200a may be filled with flooring materials or planted with aquatic plants, and thus the holder 200 may be stably fixed to the bottom of the fish tank.

As shown in FIG. 11, the holding support 200b may be, for example, provided in a plate shape in which a coupling side wall for coupling with the bottom surface of the holding body 200a protrudes along the edge while forming a shape corresponding to the bottom surface of the holding body 200a. In the coupling side wall, a plurality of inlet holes 220 are formed through at regular intervals, so that water may be distributed and introduced from multiple directions through the inlet holes 220, thereby inhibiting the floor materials from being sucked up into the holder 200.

In addition, as shown in FIG. 11, a flow path forming protrusions 230 may be protruded from the upper surface of the holding support 200b. The flow path forming protrusions 230 may be formed on the rest of the portion except for the central portion of the holding support 200b, which is a portion corresponding to the fixing pipe 210, and may protrude from each side point adjacent to each inlet hole 220 toward the central portion of the holding support 200b. The flow path forming protrusions 230 form flow paths gradually decreasing in width toward the central portion of the holding support 200b while communicating the inlet holes 220 and the central portion of the holding support 200b. Accordingly, when an updraft of air supplied through the air supply pipe 170 is generated, the water in the fish tank enters the holding support 200b through the inlet holes 220, passes through the flow paths formed by the flow path forming protrusions 230, and flows into the fixing pipe 210 from the center of the holding support 200b.

As described above, the present disclosure may not only be used when cleaning the fish tank as shown in FIG. 8, but also may be mounted in the tank using the holder 200 as shown in FIG. 12 to continuously filter out foreign matter so that the fish tank may be kept clean at all times.

DESCRIPTION OF REFERENCE NUMERALS

100: body 100a: upper body
100b: intermediate body 100c: lower body
110: inlet pipe 120: filter
121: discharge passage 130: outlet
140: seating protrusion 150: guide pipe
151: fixing protrusion 160: filter fixture
170: air supply pipe 171: air stone
172: air control member 180: air outlet
190: inlet cover
200: holder 200a: holding body
200b: holding support 210: fixing pipe
220: inlet hole 230: flow path forming protrusion
300: extension inlet pipe 310: extension joint

The invention claimed is:

1. A device for extracting foreign matter in a fish tank, the device comprising:
   a body (100) in which water is introduced through an inlet pipe (110) provided downward from inside the body, and the introduced water passes through a filter (120) disposed within the body and is discharged through an outlet (130);
   wherein a lower part of the body (100) is composed of a lower body (100c) forming a convex hemisphere downward, through which the inlet pipe (110) passes, and through which the outlet (130) is formed outside the inlet pipe (110) passing through the lower body (100c);
   wherein the filter (120) is provided to surround the inlet pipe (110), be spaced apart from sides of the body (100), and have a lower outer edge of the filter (120) come into contact with a curved surface of the lower body (100c);
   wherein the outlet (130) is provided below the filter (120), so that foreign matter filtered by the filter (120) accumulates in the body (100) through a space between the filter (120) and the sides of the body (100), and filtered water is discharged into the fish tank through the outlet (130);
   wherein the outlet (130) is formed by penetrating a point adjacent to an inner circumferential surface of the filter (120) in the lower body (100c), and wherein the lower body (100c) is provided with a seating protrusion (140) protruding upward along an outer edge of the outlet (130) so as to come into contact with a lower end of the filter (120) while forming a ring shape;
   wherein the lower body (100c) is provided with a guide pipe (150) whose lower end is located inside the outlet (130) while forming a tube shape, whose upper end is located near an upper end of the inlet pipe (110) provided inside the guide pipe, with the filter (120) being fitted over the guide pipe;
   wherein the filter (120) is made of a sponge material, and is formed to a length such that an upper end thereof of the filter (120) is positioned above the guide pipe (150) in a state where the lower end of the filter (120) is supported by the seating protrusion (140); and
   wherein the body (100) is provided with a filter fixture (160) coupled to an upper end of the guide pipe (150) while pressing the filter (120) protruding upward from the guide pipe (150) downward.

2. The device of claim 1, wherein the filter (120) is provided in the form of a cylinder having a predetermined thickness and having a hollow formed therethrough along a longitudinal direction, and is provided with a discharge passage (121) recessed along the longitudinal direction of an inner circumferential surface thereof.

3. The device of claim 1, further comprising:
   a holder (200) provided with a fixing pipe (210) upward from a point spaced apart from a bottom of the fish tank, and placed on the bottom of the fish tank; and
   wherein the body is arranged such that the inlet pipe (110) is in fluid communication with the fixing pipe (210), so that water flows into the inlet pipe (110) through the fixing pipe (210).

* * * * *